(12) United States Patent
Shibayama et al.

(10) Patent No.: US 6,262,508 B1
(45) Date of Patent: Jul. 17, 2001

(54) ROTARY ELECTRICAL DEVICE

(75) Inventors: Juzaburo Shibayama; Noboru Aoki, both of Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/368,425

(22) Filed: Aug. 5, 1999

(30) Foreign Application Priority Data

Aug. 6, 1998 (JP) .................................................. 10-234994

(51) Int. Cl.$^7$ ............................. H02K 1/00; H02K 21/00; H02K 21/26; H02K 21/12

(52) U.S. Cl. ......................... 310/181; 310/152; 310/154; 310/156

(58) Field of Search ..................................... 310/181, 216, 310/154, 156, 152, 179, 180

(56) References Cited

U.S. PATENT DOCUMENTS

| | | | |
|---|---|---|---|
| 4,745,312 | * | 5/1988 | Nagasaka ........................... 310/49 R |
| 4,758,756 | * | 7/1988 | Pouillange ............................ 310/152 |
| 4,930,201 | * | 6/1990 | Brown ..................................... 29/598 |
| 4,972,112 | * | 11/1990 | Kim ........................................ 310/181 |
| 5,117,144 | * | 5/1992 | Torok .................................... 310/269 |
| 5,444,318 | * | 8/1995 | Stumpf ..................................... 310/77 |
| 6,033,520 | * | 3/2000 | Kimura et al. ........................ 156/345 |
| 6,133,664 | * | 10/2000 | Torok et al. ........................... 310/181 |

OTHER PUBLICATIONS

"Study on Oprimum Design on PM Vernier Motor", Institute of Electrostatics Japan, Akira Ishizaki et al., vol. 114–D, No. 12, 1994.

* cited by examiner

*Primary Examiner*—Nestor Ramirez
*Assistant Examiner*—Dang Dinh Le
(74) *Attorney, Agent, or Firm*—Wenderoth, Lind & Ponack, L.L.P.

(57) ABSTRACT

It is an object of the present invention to provide a rotary electrical device that can be manufactured easily, and which produces a high output torque at low operating speeds. The rotary electrical device comprises: a stator core.

The rotary electrical device comprises: a stator core having $Z_1$ stator slots for receiving three-phase windings which generate a rotational magnetic field of p magnetic pole pairs in the stator core, and $Z_1$ permanent magnets being provided in tooth sections fabricated between the stator slots around the stator core; and a rotor core having $Z_2$ permanent magnets being provided around the rotor core; wherein $Z_1$, $Z_2$ and p are related by an expression $Z_2=Z_1 \pm p$, and direction of magnetic poles of all permanent magnets are aligned identically in a radial direction.

21 Claims, 4 Drawing Sheets

ROTARY ELECTRICAL DEVICE

BACKGROUND OF THE INVENTION

1. Field of the Invention

The present invention relates to a rotary electrical device driven by a three-phase power supply whose stator and rotor cores are provided with bonded permanent magnet strips, producing a high torque at slow operating speeds for use in electrical motors such as vernier motors.

2. Description of the Related Art

FIG. 1 is a schematic cross sectional view of a conventional vernier motor. A stator core 11 is provided with $Z_1$ slots 24 for installing three-phase windings to produce rotational magnetic fields of p magnetic pole pairs, and is also provided with permanent magnets 15 which are bonded to the inner surface of each slot 24. It follows that there are $Z_1$ permanent magnets provided for the stator core 11. For the rotor core 10, there are $Z_2$ permanent magnets 16 provided equidistantly along its outer peripheral surface. The number of permanent magnets $Z_2$ on the rotor core and the number of permanent magnets $Z_1$ on the stator core are related by the following expression:

$$Z_2 = Z_1 \pm p$$

The permanent magnets on the stator core 11 and those on the rotor core 15 are arranged so that the magnetic poles are identically oriented in the radial direction. That is, if the polarities of the permanent magnets 15 on the stator core 11 are such that the outer side is the N-pole and the inner side is the S-pole, then the permanent magnets 16 on the rotor core 10 are arranged so that the polarities are also the N-pole on the outer side and the S-pole on the inner side.

Such a vernier motor is operated by rotating magnetic fields produced by the three-phase windings in the slots on the stator core, and exhibits a characteristic ability to produce a high output torque at low speeds, because of the effects of the permanent magnets having attracting poles across a clearance gap between the stator and rotor cores. The rotational speed ωv of such a vernier motor is given by:

$$\omega v = \omega / Z_2$$

where ω is the angular speed of the rotating magnetic fields produced by the alternating current supplied to the three-phase windings. Therefore, the vernier motor can be operated at a rotational speed that is $1/Z_2$ lower than the angular speed ω generated by normal rotating magnetic fields. Similarly, the rotational torque Tv is given by:

$$Tv = (Z_2/p) \times \tau$$

where τ is the normal torque produced in a permanent magnet type synchronous motor, so that an output torque produced is $(Z_2/p)$ times greater than that produced by a normal permanent magnet type synchronous motor.

Such vernier motors are, therefore, ideally suited to applications such as wafer polishing apparatus that requires a high turning power at slow rotational speeds. In a polishing apparatus to produce a flat and mirror polished surface on a semiconductor wafer, the top ring holding the wafer is pressed against the polishing surface (cloth or fixed abrasive materials) mounted on a turntable at a given pressure, and both are rotated at low speeds with a polishing solution (slurry or pure water etc.) at the contact interface of the wafer and the polishing surface, until polishing is completed. Such a polishing apparatus is operated typically at 15 r.p.m., and the motor is required to produce a high output torque to overcome a large frictional resistance generated at the contact interface of the wafer and the polishing surface. Normal induction motors do not easily exhibit the characteristics necessary for such low speed, high torque operations, so that vernier motors are much more suitable for such applications.

However, the vernier motor shown in FIG. 1 presents the following operational problems. The first problem is that, because the permanent magnets 15 are placed at the inner opening of the slot 24, magnetic resistance is increased in a slot section, and correspondingly, the total available magnetic flux is reduced. This has an effect of reducing the torque that can be generated by the motor.

The second problem is related to the design of the motor. Because the permanent magnets 15 are to be placed at the opening of each slot 24 of the stator core, the magnets must be bonded after the conductive wires of the windings are installed in the stator slots and fixated with varnish. In other words, after the wires are installed in the slots, varnish is used to enhance electrical insulation as well as the fixate the wires inside the slots. However, varnish applied to the permanent magnets 15 interferes with a bonding operation of the permanent magnets 15 to the inside surfaces of the stator core 11 with an adhesive agent, so that it becomes difficult to produce secure bonding of the magnets on the stator core. Even more important is a loss of the distinguishing feature, which is the narrow clearance gap between the stator core 11 and the rotor core 10, because of the unavoidable variations that occur in the varnished conditions at the opening section. Such variations in the gap dimension is a primary cause of variability in the performance of vernier motors produced by the conventional assembly method.

Remedial steps that may be taken include masking of the bonding surfaces of the stator core beforehand to avoid application of varnish thereto, or removal of varnish from the bonding surfaces before bonding. These steps are very cumbersome and labor-intensive, and require careful process monitoring because any residual varnish can affect the gap size and consequently the motor performance.

SUMMARY OF THE INVENTION

It is an object of the present invention to provide a rotary electrical device that can be manufactured easily, and which produces a high output torque at low operating speeds.

To achieve the object of the present invention, there is provided a rotary electrical device comprising: a stator core having $Z_1$ stator slots for installing three-phase windings which generate rotational magnetic fields of p magnetic pole pairs in the stator core, and $Z_1$ permanent magnets provided in tooth sections fabricated between the stator slots around the stator core; and a rotor core having $Z_2$ permanent magnets being provided around the rotor core; wherein $Z_1$, $Z_2$ and p are related by an expression $Z_2 = Z_1 \pm p$, and the direction of the magnetic poles of all the permanent magnets are aligned identically in a radial direction.

According to one aspect of the present invention, there is provided a method for manufacturing a rotary electrical device having a stator core and a rotor core, with the stator core having $Z_1$ stator slots for installing three-phase windings so as to produce rotational magnetic fields of p magnetic pole pairs and $Z_1$ permanent magnets, and with the rotor core having $Z_2$ permanent magnets such that $Z_1$ and $Z_2$ are related by an expression $Z_2 = Z_1 \pm p$, wherein the method comprises: preparing a plurality of stator slots for installing three-phase windings with tooth sections fabricated between the stator slots; affixing $Z_1$ permanent magnets in the tooth sections; installing the three-phase windings in the stator slots; and varnishing an assembled unit of the stator core, magnets and windings.

One of the features of the present invention is that the magnetic resistance to impede operation of the present rotary electrical device is reduced significantly compared with the conventional design of rotary electrical devices in which stator magnets are bonded in front of the opening of each stator slot, because the stator permanent magnets in the present device are moved away from the opening to lateral inner surfaces of the stator tooth sections such that these magnets are not radially between the center of the rotor and the slots, respectively. Available magnetic flux densities are thus increased because of the shorter magnetic path, and the output torque is increased for a given size of the motor.

Because the step of affixing the magnets can be performed before installing the electrical windings, the degree of freedom in the manufacturing process is greatly increased. In assembling the device, the magnets are installed first in the open-channels in the tooth sections provided on the stator core, followed by installing the windings in the stator slots and then applying varnish on the assembled unit of the stator core, magnets and windings.

The present rotary electrical device can be manufactured by simply inserting the magnets in closed-channels provided on the stator and rotor cores. Because of the elimination of the bonding process of the magnets, that requires close attention, the manufacturing process has been significantly simplified. Also, because the magnetic pieces do not extend into the clearance gap, the gap dimension can be controlled precisely by machining the stator and rotor cores, thereby improving the consistency of motor performance of motors produced from various production lots.

The present rotary electrical device may be applied to a polishing apparatus comprised of a top ring for holding a polishing object; and a turntable having a polishing surface to produce a flat and mirror polish on the polishing object, wherein the turntable is driven by a rotary electrical device according to the present invention.

Compared with currently available polishing apparatuses, the use of the present rotary electrical device for driving the turntable results in a significantly higher torque at stable low speeds, thereby enabling the expansion of the range of potential polishing objects that can be handled by the polishing apparatus as well as the applicable range of polishing conditions, while increasing the efficiency of the polishing operation and improving the quality of polished products.

The above and other objects, features, and advantages of the present invention will become apparent from the following description when taken in conjunction with the accompanying drawings, which illustrate preferred embodiments of the present invention by way of example.

DETAILED DESCRIPTION OF THE PREFERRED EMBODIMENTS

Preferred embodiments will be presented in the following with reference to the attached drawings.

Figure 1:
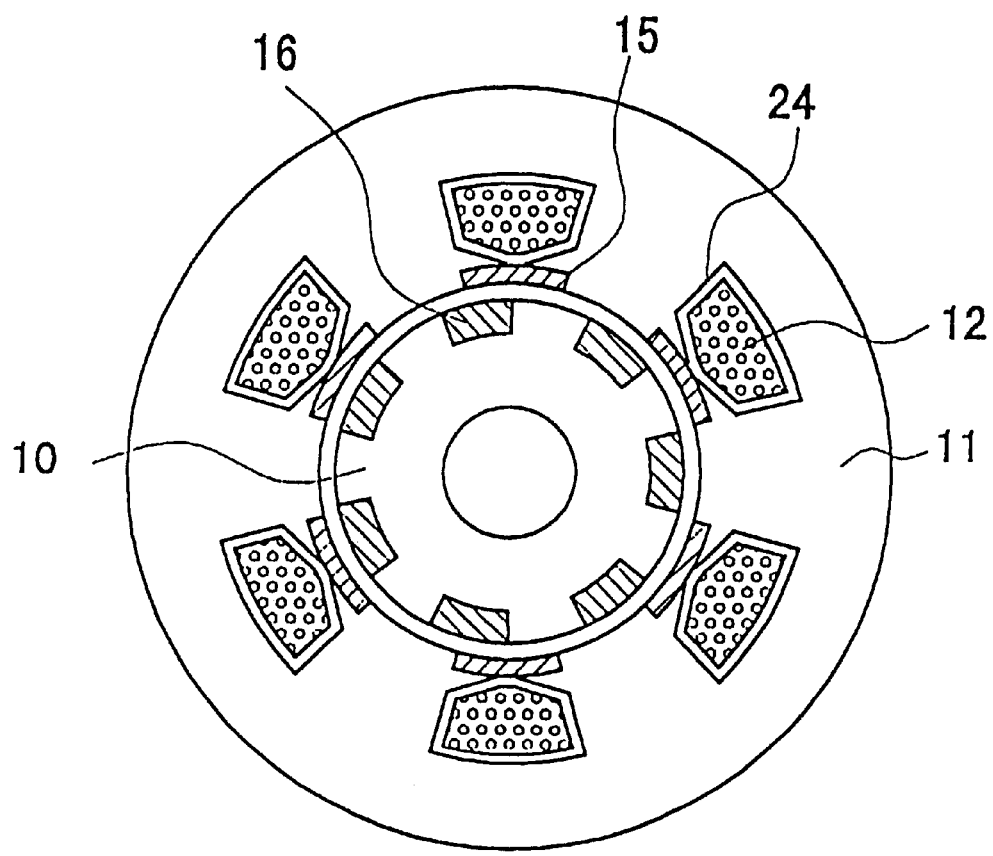
FIG. 1 is a cross sectional view of a conventional vernier motor.
Figure 2:
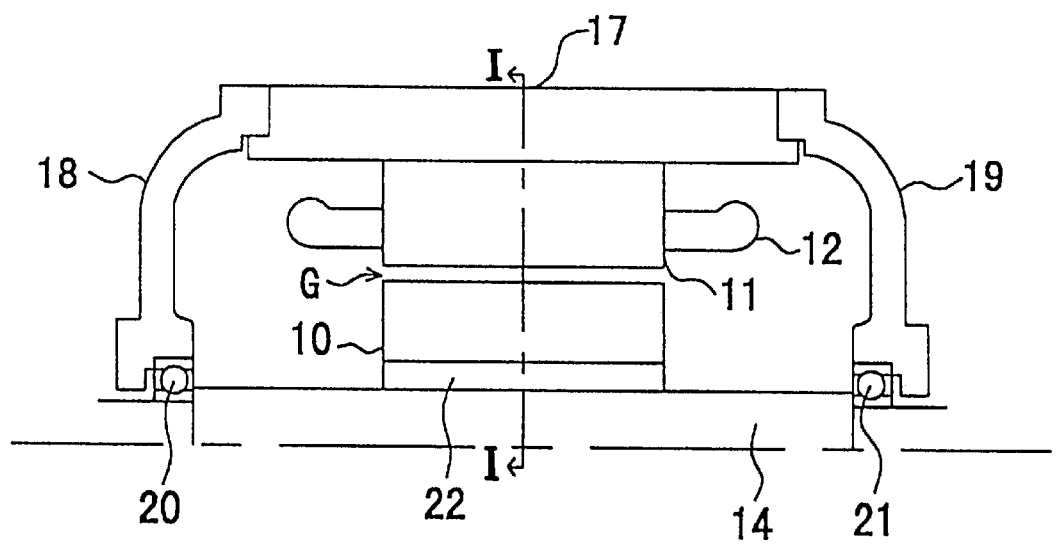
FIG. 2 is a cross sectional view of an example of the vernier motor of the present invention.
Figure 3:
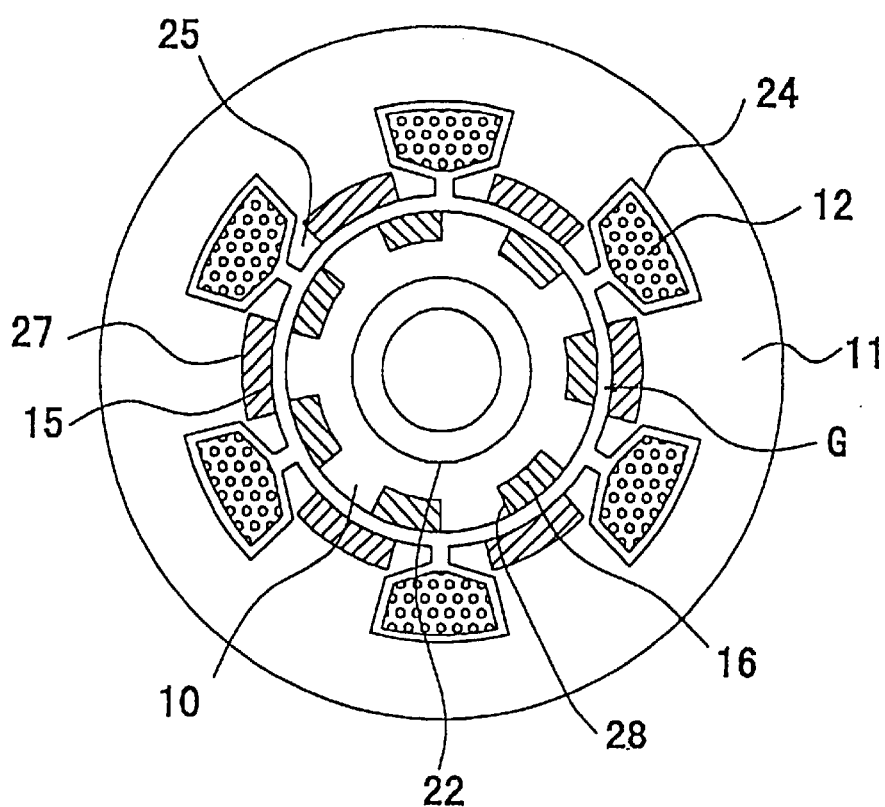
FIG. 3 is an enlarged cross sectional view seen in the direction I—I in the vernier motor shown in FIG. 2.

FIG. 2 shows a cross sectional view of a first embodiment of the vernier motor of the present invention, and FIG. 3 shows a cross sectional view seen in the direction I—I in FIG. 2. A main shaft 14 is fixed to rotor core 10, and both ends of the main shaft 14 are supported by bearings 20, 21. An outer surface of the rotor core 10 opposes an inner surface of the stator core 11 with an intervening clearance gap G therebetween. Three-phase windings 12 are installed on the stator core 11, which is fixed to a casing frame 17 and, together with casing brackets 18 and 19, serves as a housing for the stator core 11 and the rotor core 10.

A feature of the present motor is the way that permanent magnets are affixed on the stator core 11, as shown in FIG. 3. Slots 24 are formed equidistantly around the inner surface of the stator core 11 to house three-phase windings 12 constituted by U, V and W phases. The number of slots is given by $Z_1$ (in this case six). The three-phase windings 12 produce rotating magnetic fields having 2p poles (where p indicates the number of magnetic pole pairs, and in this case, there are two poles, i.e. one paired magnetic pole pair). Stator tooth sections 25 are provided between slots 24, and stator open-channel sections 27 are formed in center regions of the tooth sections which face the inner gap so that permanent magnets 15 can be embedded in the open-channel sections 27. Rotor channel sections 28 are equidistantly dispersed on the outer surface of the rotor core 10 so as to receive $Z_2$ permanent magnets 16. The numbers $Z_1$ and $Z_2$ for the stator slots and the rotor permanent magnets, respectively, are related by the following expression.

$$Z_2 = Z_1 \pm p$$

where $Z_1=6$, $Z_2=7$ and p=1, in this particular case. The permanent magnets 15, 16 are affixed so that their polarities are aligned identically in the radial direction for all the magnets.

It should be noted that a free end of the permanent magnets 15 affixed on the stator may extend into the clearance gap G beyond the inner radial surface of the stator tooth section 25, and similarly, a free end of the permanent magnet 16 affixed on the rotor core may extend into the clearance gap G from the outer radial surface of the rotor core 10.

When the permanent magnets 15, 16 are arranged as shown in FIG. 3, a radially extending magnetic flux is formed by each magnet through the clearance gap G. This produces differential magnetic fields between the outer surface of the stator core and the inner surface of the rotor core, and complete magnetic paths are thus formed starting from the stator core 11, through the frame 17, brackets 18, 19, bearings 20, 21, main shaft 14, rotor core 10, clearance gap G and returning to the stator core 11.

However, such magnetic paths formed through the bearings 20, 21, may interfere with the proper operation of the bearings. Therefore, to prevent potential magnetic interference, a magnetic flux blocker 22, made of a non-magnetic material, is disposed on the bottom surface of the rotor core 10, thereby increasing the magnetic resistance to prevent the fluxes from passing through the bearings 20, 21.

Next, an assembly operation of such a vernier motor will be explained. In this embodiment, $Z_1$ slots 24 for the windings and channels 27 on the tooth sections 25 between the slots 24 are fabricated on the stator core by performing a machining operation 15 are bonded into the channels 27, and the windings 12 are installed in the slots 24. The assembled unit of the stator core, magnets and windings is then coated and treated with varnish. This assembly procedure allows magnets to be installed before the varnishing step so that stripping of the varnish coating, which was necessary in the conventional process, has been eliminated. Other extraneous steps, such as masking to prevent varnish from being applied to unwanted surfaces, are also eliminated, thereby simplifying the overall process. Additionally, because the magnets are bonded into machined channels, the pole surface can be positioned to extend into the clearance gap G at a precisely controlled distance, thereby improving the uniformity of the performance of an assembled motor.

Figure 4:
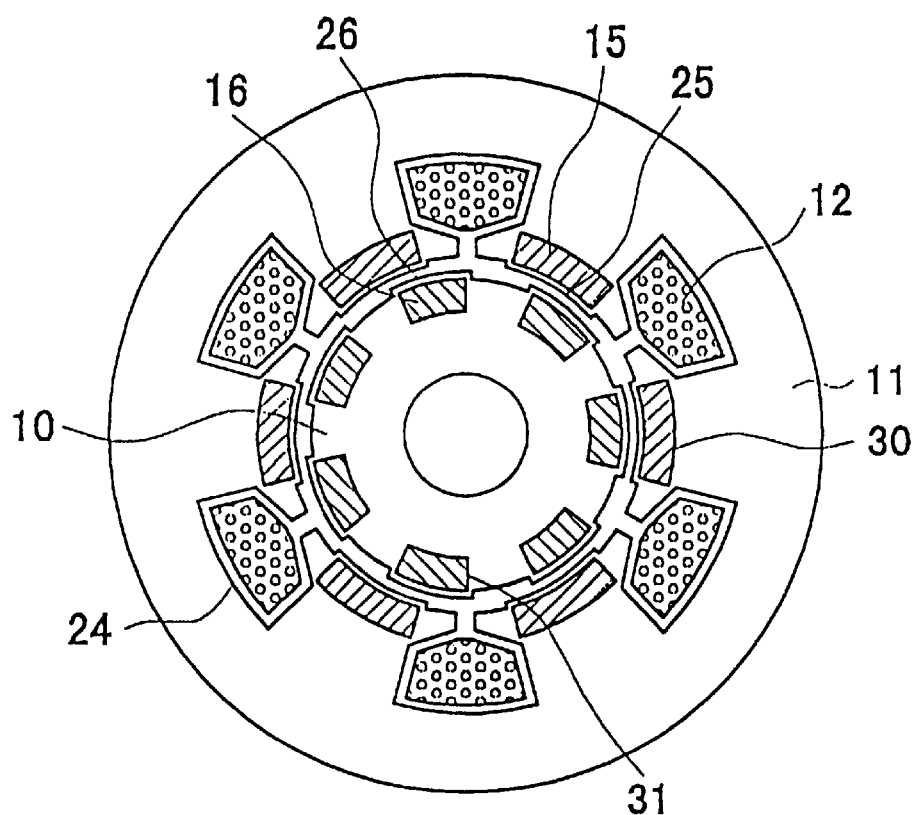
FIG. 4 is an enlarged cross sectional view of a second embodiment of the vernier motor seen in the direction of I—I in the motor shown in FIG. 2.

FIG. 4 shows a second embodiment of the vernier motor. The overall construction of the motor is the same as that shown in FIG. 3, but the difference is that instead of the open-channels 27, 28, closed channels 30, 31 are provided in the tooth sections of the stator core and the rotor core, respectively. Machined tooth sections are provided for both the stator and rotor cores. These closed-channels 30, 31 are hollow sections extending in the axial direction of the stator core and the rotor core, respectively, and the permanent magnets 15, 16 are inserted into the respective hollow sections.

Figure 5:
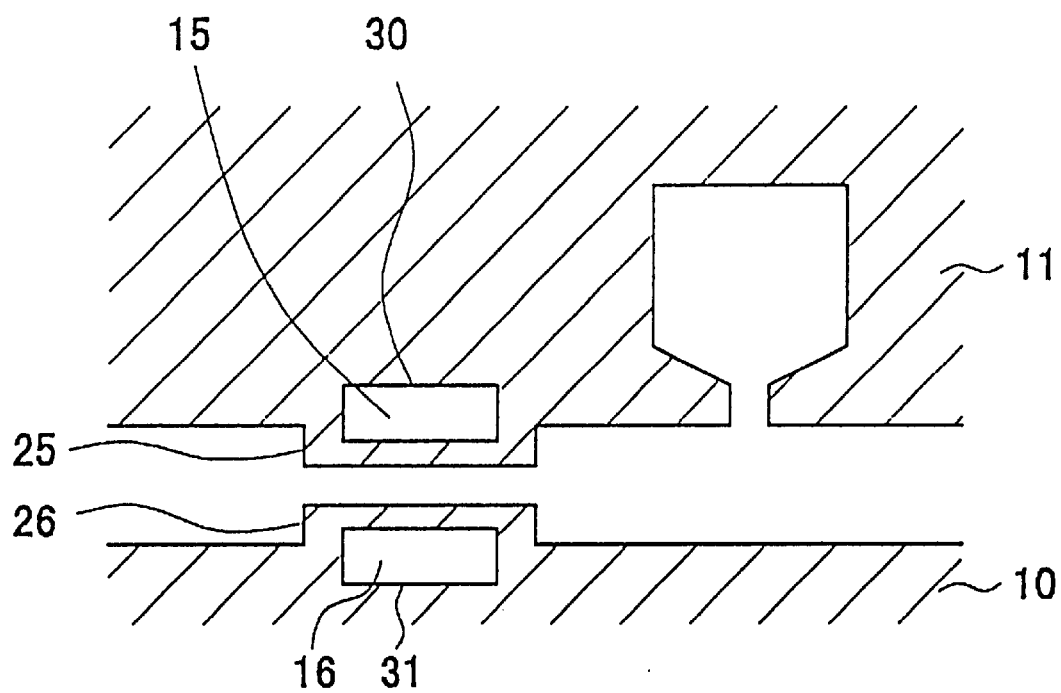
FIG. 5 is an enlarged view of the key parts of the motor shown in FIG. 4.

FIG. 5 shows an expanded view of a portion of the channels 30, 31 and associated tooth sections. As shown in FIG. 5, tooth sections 25, 26 extend into the clearance gap G between the stator and rotor cores, and slots 30, 31 for receiving respective magnets 15, 16 are formed on the interior of the corresponding tooth sections. Each tooth section is positioned centrally between two slots 24. As in the previous embodiment, the polarities of the magnets 15, 16 are aligned identically in the radial direction. Like in the previous embodiment, magnetic fluxes are formed in the radial direction through the clearance gap G, and a nonmagnetic material piece 22 is provided to prevent the flux from passing through the bearings 20, 21.

The magnet placement design of the prevent invention enables the utilization of the magnetic fluxes offered by the magnets much more effectively, compared with the design of placing the magnets at the inner opening side of the slots, which tended to reduce the available magnetic fluxes, and thereby offering a much higher torque for a given size of the motor. Also, because the magnets are contained inside the closed-channels and embedded within the stator and rotor cores, eddy currents are largely prevented from affecting the magnets so as to prevent heating of the magnets during operation of the motor.

In this embodiment, the magnets can be inserted into the closed-channels so that bonding and other cumbersome steps are eliminated, thereby simplifying the assembly process of the vernier motor and lowering the cost of manufacturing. The teeth sections provided on the inner surface of the stator core and the outer surface of the rotor core enable improved utilization of the available magnetic fluxes so that a higher torque can be made available at a relatively low current requirement. Because the dimensional precision of the tooth sections is determined by machining of the channels, the dimension of the clearance gap G can be much more precisely controlled, thereby enabling the manufacture of vernier motors with improved uniformity in motor performance using a relatively simple assembly procedure.

Figure 6:
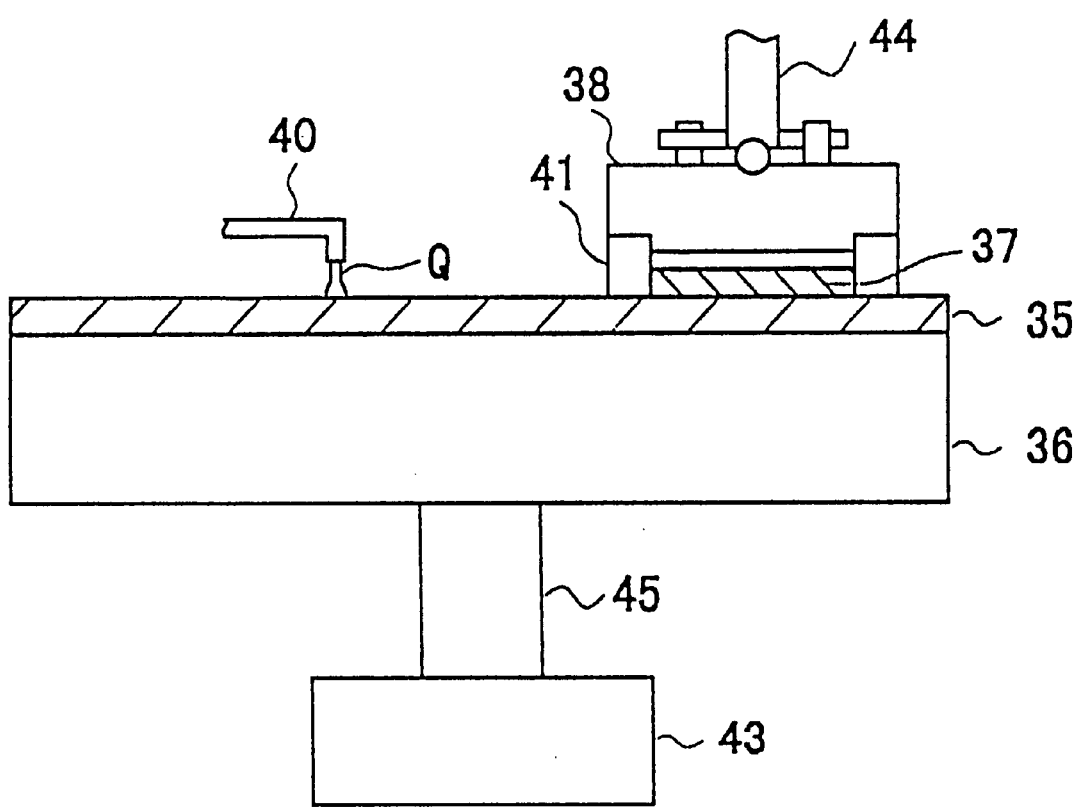
FIG. 6 is a cross sectional view of a polishing apparatus using a vernier motor.

FIG. 6 shows an example of applying such a vernier motor to a polishing apparatus. The polishing apparatus is comprised of a rotating turntable 36 with a polishing cloth 35, made of such material as urethane; a top ring 38 for holding a polishing object 37, such as a semiconductor wafer, in such a way to allow the object 37 to be rotated and pressed against the polishing cloth 35; and a nozzle 40 for supplying a polishing solution Q to the polishing interface of the polishing cloth and the polishing object. Top ring 38 is connected to a top ring shaft 44, and the wafer 37 is held on the bottom of the top ring 38 with an intervening elastic mat. To prevent the wafer 37 from being spun out from the bottom of the top ring 38 during polishing, the top ring 38 is provided with a guide ring 41 on its outer periphery. The guide ring 41 is fixed to the top ring 38 so that the wafer 37, pushed by the frictional forces of polishing against the inside periphery of the guide ring 41, will be retained within the guide ring 41. The top ring 38 is supported by the top ring shaft 44 so as to permit tilting of the top ring 38 relative to the top ring shaft 44 to maintain the wafer 37 in proper contact with the polishing cloth 35.

Polishing is carried out by pressing the wafer 37, held on the bottom of the top ring 38, against the polishing cloth 35 mounted on the turntable 36 while both the top ring 38 and the turntable 36 are rotated independently, so that the polishing cloth 35 and the wafer 37 undergo a relative sliding motion at the contact interface of the wafer 37 and the polishing cloth 35. The turntable 36 is revolved by the rotary action transmitted through the main shaft 45 from a vernier motor 43, such as the one described in the foregoing embodiments. Polishing solution Q is supplied during polishing, from the nozzle 40 to the contact interface between the wafer 37 and the polishing cloth 35. The polishing solution Q includes a suspension of microparticles of silica in an alkaline solution, for example, so that chemical polishing effects produced by the alkaline solution are combined with a mechanical abrading action produced by the micro-particles to polish the wafer 37 until a flat and mirror polished surface is achieved.

Vernier motors 43 for such applications are generally operated at a low speed, such as 15 r.p.m.~150 r.p.m., but are required to provide a sufficient torque to overcome frictional forces at the contact interface between the wafer 37 and the polishing cloth 35. Therefore, an example of vernier type polishing motor is based on four poles (p=2) of three-phase windings with $Z_1=42$, and $Z_2=44$. A gap G of 0.4~0.5 mm is produced accurately using the techniques presented in the foregoing embodiments. When a normal induction type motor is operated at low speeds such as 15 r.p.m. by virtue of an inverter circuit, a considerable voltage drop is produced through the circuit so that the output torque is quite low and is insufficient to drive the turntable. In contrast, when the present vernier motor is used, suitable low speed and sufficiently high torque is produced to achieve a wide range of polishing conditions suitable for achieving a flat and mirror polished surface on a wide variety of objects.

Moreover, a vernier motor can be used for a top ring motor of the polishing apparatus.

It is obvious that, although the invention is directed towards vernier motors, the invention is equally applicable to stepping motors. Specifically, an application can be illustrated using the following example.

A stepping motor has a stator core with $Z_1$ slots, a rotor core with $Z_2$ slots, and p number of magnetic pole pairs, wherein $Z_1$, $Z_2$ and p are related by an expression:

$$Z_2=Z_1+p$$

and the slots in the stator core are wound with three-phase windings to produce p number of magnetic pole pairs, and the number of permanent magnets corresponding to the number of slots are affixed in the stator and rotor cores, and as in the foregoing embodiments, the polarities of the magnets are aligned in the same direction. The rotor core is divided axially into two blocks to face the stator core, and the two blocks are turned in the circumferential direction through an angle corresponding to ½ of the slot spacing on the rotor core, and are fixed to the shaft in this position. Permanent magnets are affixed in all the slots of at least one of the stator core and the rotor core. The polarities of the magnets are aligned identically in each block, but are reversed in each block. Three-phase windings may be provided as fractional slot windings.

Further, a vernier motor can be used as a high torque servo motor, and also used as a rotational position controllable motor because of the instant invention.

In summary, therefore, the present rotary electrical device can provide a high torque output to such special purpose motor as vernier motors and stepping motors, and enables the manufacture of such motors by simple and efficient assembly steps.

Although certain preferred embodiments of the present invention has been shown and described in detail, it should be understood that various changes and modifications may be made therein without departing from the scope of the appended claims.

What is claimed is:

1. A rotary electrical device comprising:
    a rotor core including circumferentially spaced rotor permanent magnets; and
    a stator core surrounding said rotor core and having circumferentially spaced stator slots separated by stator tooth sections, respectively, with stator permanent magnets positioned within said tooth sections, respectively, and with three-phase windings positioned within said stator slots, wherein said three-phase windings generate a rotational magnetic field of p magnetic pole pairs in said stator core;
    wherein part of each said stator permanent magnet is not radially between a center of said rotor core and a respective said stator slot,
    wherein said stator permanent magnets are $z_1$ in number and said rotor permanent magnets are $z_2$ in number, such that the equation $z_2 = z_1 \pm p$ is realized,
    wherein polarities of said stator permanent magnets and said rotor permanent magnets are identically radially aligned, and
    wherein said stator core and said rotor core define a clearance gap therebetween, said stator tooth sections include respective portions defining closed-channels and extending into said clearance gap, and said stator permanent magnets are positioned within said closed-channels, respectively.

2. The rotary electrical device according to claim 1, wherein said rotor core includes rotor tooth sections having respective portions defining closed-channels and extending into said clearance gap, and said rotor permanent magnets are positioned within said closed-channels of said rotor tooth sections, respectively.

3. The rotary electrical device according to claim 2, wherein said rotor permanent magnets are not bonded within said closed-channels of said rotor tooth sections.

4. The rotary electrical device according to claim 1, wherein said stator permanent magnets are not bonded within said closed-channels of said stator tooth sections.

5. The rotary electrical device according to claim 1, wherein said rotary electrical device is utilized in a polishing apparatus comprising a top ring for holding a polishing object and a turntable having a polishing surface to produce a flat and mirror finish on said polishing object, with said turntable to be driven by said rotary electrical device.

6. A rotary electrical device comprising:
    a rotor core; and
    a stator core surrounding said rotor core and having circumferentially spaced stator slots separated by stator tooth sections, respectively, with stator permanent magnets positioned within said tooth sections, respectively;
    wherein part of each said stator permanent magnet is not radially between a center of said rotor core and a respective said stator slot, and
    wherein said stator core and said rotor core define a clearance gap therebetween, said stator tooth sections include respective portions defining closed-channels and extending into said clearance gap, and said stator permanent magnets are positioned within said closed-channels, respectively.

7. The rotary electrical device according to claim 6, wherein said rotor core includes rotor tooth sections having respective portions defining closed-channels and extending into said clearance gap, and said rotor permanent magnets are positioned within said closed-channels of said rotor tooth sections, respectively.

8. The rotary electrical device according to claim 7, wherein said rotor permanent magnets are not bonded within said closed-channels of said rotor tooth sections.

9. The rotary electrical device according to claim 6, wherein said stator permanent magnets are not bonded within said closed-channels of said stator tooth sections.

10. A rotary electrical device comprising:
    a rotor core including circumferentially spaced rotor permanent magnets; and
    a stator core surrounding said rotor core and having circumferentially spaced stator slots separated by stator tooth sections, respectively, with stator permanent magnets positioned within said tooth sections, respectively;
    wherein said stator permanent magnets are $z_1$ in number and said rotor permanent magnets are $z_2$ in number, such that the equation $z_2 = z_1 \pm p$ is realized, with p corresponding to a number of magnetic pole pairs in said stator core, and
    wherein said stator core and said rotor core define a clearance gap therebetween, said stator tooth sections include respective portions defining closed-channels and extending into said clearance gap, and said stator permanent magnets are positioned within said closed-channels, respectively.

11. The rotary electrical device according to claim 10, and further comprising three-phase windings positioned within said stator slots, wherein said three-phase windings generate a rotational magnetic field of the p magnetic pole pairs in said stator core.

12. The rotary electrical device according to claim 10, wherein polarities of said stator permanent magnets and said rotor permanent magnets are identically radially aligned.

13. The rotary electrical device according to claim 12, wherein said rotor core includes rotor tooth sections having respective portions defining closed-channels and extending into said clearance gap, and said rotor permanent magnets are positioned within said closed-channels of said rotor tooth sections, respectively.

14. The rotary electrical device according to claim 13, wherein said rotor permanent magnets are not bonded within said closed-channels of said rotor tooth sections.

15. The rotary electrical device according to claim 10, wherein said stator permanent magnets are not bonded within said closed-channels of said stator tooth sections.

16. The rotary electrical device according to claim 10, wherein said rotary electrical device is utilized in a polishing apparatus comprising a top ring for holding a polishing object and a turntable having a polishing surface to produce a flat and mirror finish on said polishing object, with said turntable to be driven by said rotary electrical device.

17. A rotary electrical device comprising:

a rotor core; and a stator core surrounding said rotor core and having circumferentially arranged stator slots separated by stator tooth sections, respectively, with stator permanent magnets positioned within said tooth sections, respectively;

wherein said stator core and said rotor core define a clearance gap therebetween, said stator tooth sections include respective portions defining closed-channels and extending into said clearance gap, and said stator permanent magnets are positioned within said closed-channels, respectively.

18. The rotary electrical device according to claim 17, wherein said rotor core includes rotor tooth sections having respective portions defining closed-channels and extending into said clearance gap, and said rotor permanent magnets are positioned within said closed-channels of said rotor tooth sections, respectively.

19. The rotary electrical device according to claim 18, wherein said rotor permanent magnets are not bonded within said closed-channels of said rotor tooth sections.

20. The rotary electrical device according to claim 17, wherein said stator permanent magnets are bonded within said open-channels of said stator tooth sections.

21. The rotary electrical device according to claim 17, wherein said rotary electrical device is utilized in a polishing apparatus comprising a top ring for holding a polishing object and a turntable having a polishing surface to produce a flat and mirror finish on said polishing object, with said turntable to be driven by said rotary electrical device.

\* \* \* \* \*